Figure 7:
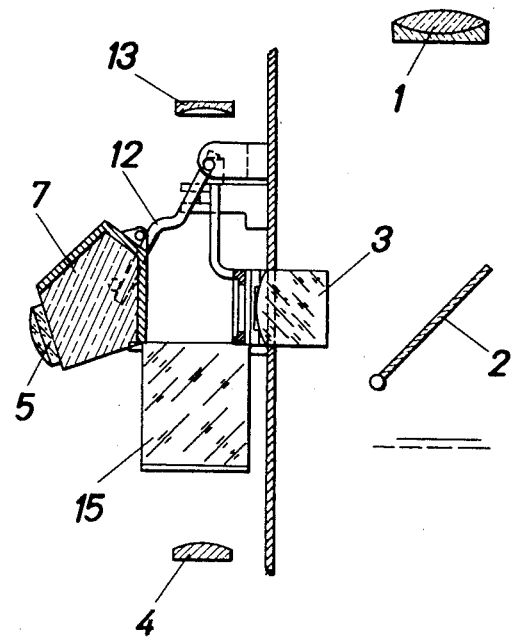

March 12, 1957　　　F. MEYER　　　2,784,654
MIRROR REFLEX CAMERAS
Filed July 27, 1953　　　4 Sheets-Sheet 1
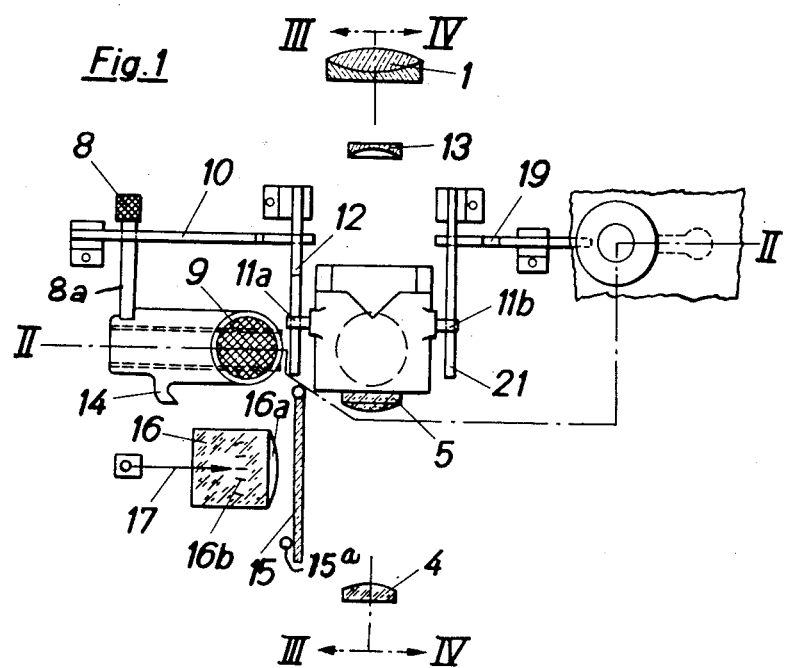
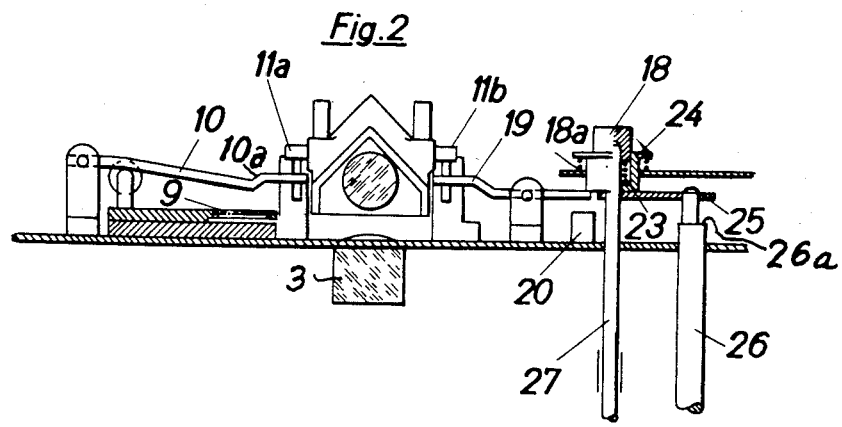
INVENTOR
FRITZ MEYER March 12, 1957 F. MEYER 2,784,654
MIRROR REFLEX CAMERAS
Filed July 27, 1953 4 Sheets-Sheet 2
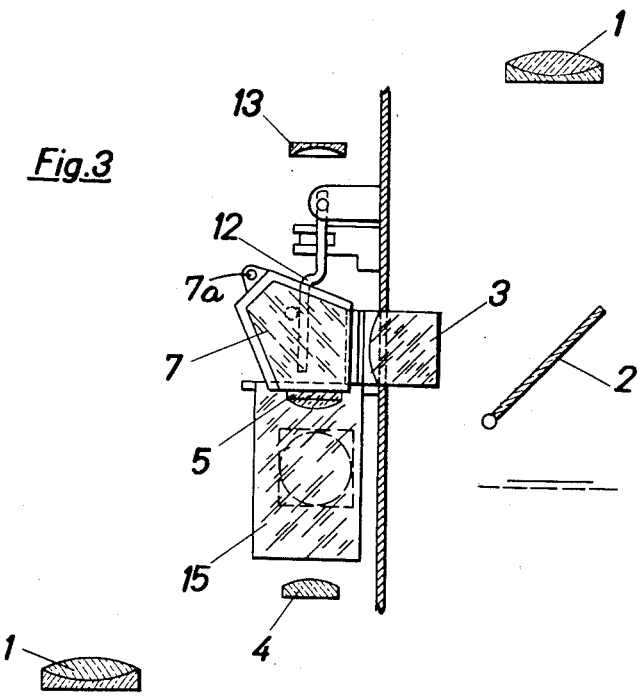
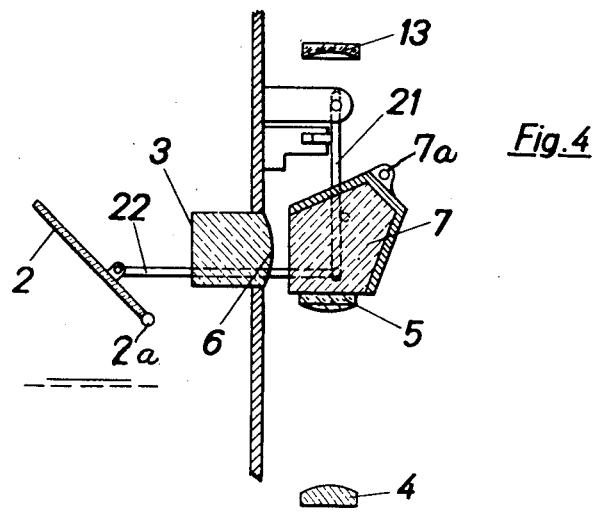
INVENTOR
FRITZ MEYER

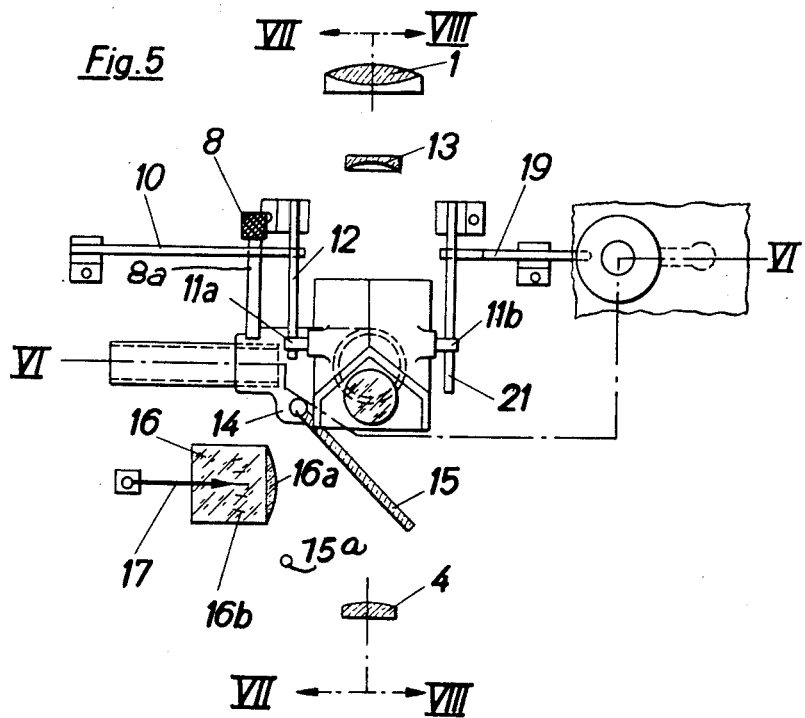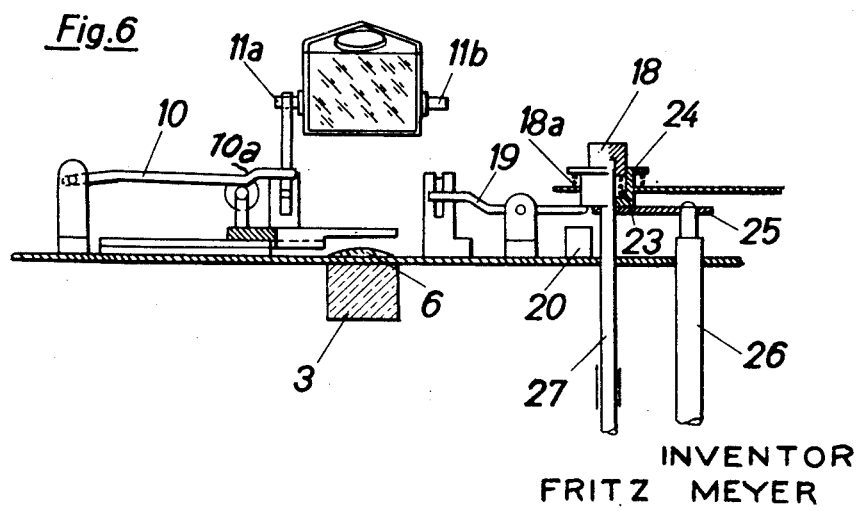

March 12, 1957  F. MEYER  2,784,654
MIRROR REFLEX CAMERAS
Filed July 27, 1953  4 Sheets-Sheet 4

INVENTOR
FRITZ MEYER

United States Patent Office 2,784,654
Patented Mar. 12, 1957

2,784,654
MIRROR REFLEX CAMERAS

Fritz Meyer, Munich, Germany, assignor to Agfa Camera-Werk Aktiengesellschaft, Munich, Germany, a corporation of Germany Application July 27, 1953, Serial No. 370,545

Claims priority, application Germany August 4, 1952

8 Claims. (Cl. 95—42)

The present invention relates to cameras of the mirror reflex type and more particularly to those having a pivoted reflex element mounted above the ground glass plate. Specifically, the invention relates to an improved camera of the type specified including a Newton finder which is arranged to cooperate with an exposure metering device whereby the view presented in the Newton finder may have superimposed thereon a picture of the exposure reading on a graduated scale.

It is a well-known expedient to provide mirror reflex cameras with pivoted reflex elements positioned above the usual ground glass plate for movement into and out of the reflex position. It is also well known to incorporate a photosensitive member for measuring exposure light, either above or beneath the glass plate, and to interconnect the same with the reflex element to swing the reflex element out of operative position when it is desired to measure the exposure light. This arrangement, while performing effectively for the purpose intended fails to provide a much-needed simplification in the operation of adjusting the camera for the proper picture. In particular, present camera constructions require the camera operator to make independent adjustments of the exposure time control elements, while simultaneously being forced to remove his eye from the Newton viewer to read the exposure meter. As a consequence, the operator often fails to correlate the necessary control settings, resulting in poor pictures.

It has been discovered, however, that the inefficacies of the prior art constructions may be completely eliminated by a simple mechanical and optical adjustment in the viewer components. In particular, it has been discovered that a direct reading of the conventional scale and pointer measuring mechanism may take place without requiring the operator to remove his eye from the Newton viewer whereby the adjustment of the proper exposure time is greatly simplified. More specifically, it has been found that the coupling of the exposure measuring device with a partially transparent mirror element positioned behind the eye piece of the Newton viewer may be so correlated with a scale picture of the measuring components of the exposure meter that the meter's reading is directly reflected into the path of the rays of the Newton viewer.

It is therefore an object of the present invention to provide a simplified exposure measuring device in combination with a mirror reflex camera. It is a further object of the present invention that the reflex element may be moved into and out of operative position independently of the reflex mirror. Yet another object of the invention is to provide interconnected control means so arranged that actuation of the shutter release mechanism simultaneously moves both the reflex element and reflex mirror to non-operative positions. A still further object of the invention is the provision of connection means between the reflex element, the reflex mirror, and the shutter release mechanism such that the reflex element may be pivoted to a non-operative position independently of movement of the reflex mirror or shutter release by introduction of the photo element which measures the exposure light.

Figure 8:
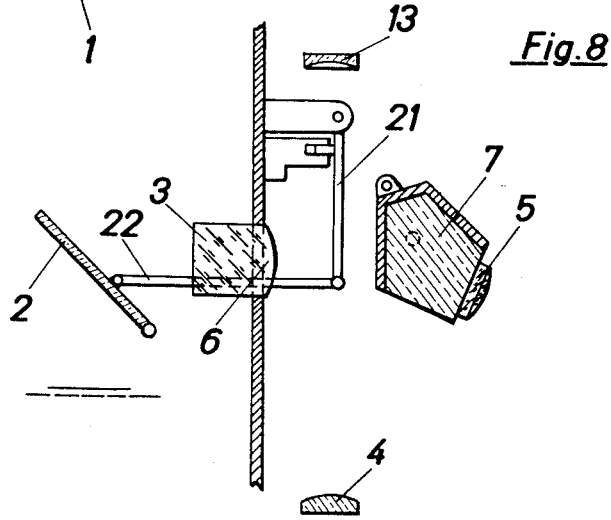

Having broadly described the invention, reference will now be made to the accompanying drawings in describing a specific embodiment thereof, and in which:

Fig. 1 is a schematic view, partly in section, illustrating the mirror reflex arrangement with the photo element in non-operative position, Fig. 2 is a sectional view along line II—II of Fig. 1, Fig. 3 is a sectional view along the line III—III of Fig. 1, Fig. 4 is a sectional view along the line IV—IV of Fig. 1, Fig. 5 is a schematic view, partly in section, of the mirror reflex arrangement with the photo element in operative position, Fig. 6 is a sectional view along the line VI—VI of Fig. 5, Fig. 7 is a sectional view along the line VII—VII of Fig. 5, Fig. 8 is a sectional view along the line VIII—VIII of Fig. 5.

As shown in Figs. 1 through 4 inclusive, the reflex mirror arrangement comprises an exposure lens 1 through which the picture rays are projected to a pivoted reflex mirror 2 (see Figs. 3 and 4) which in turn reflects the picture upon a conventional ground glass plate 3 having a lens element 6. The light rays collected by the lens 1 and reflected into plate 3 and lens 6 by mirror 2, then pass through a pivoted roof-edge prism 7 and thence through a lens 5 to a viewing lens 4, all in a conventional manner. The viewer system 4, 5 and 6 presents the viewed picture in upright position and correct as to the size in order to provide for very sharp adjustment.

In order to permit measuring of the light intensity of the viewed picture to determine the necessary exposure time which should be pre-set into the shutter release mechanism, an opaque photosensitive element 9 is mounted for lateral reciprocation into registry over lens 6 (see Fig. 6). Alternatively, photosensitive member 9 may be mounted below the ground glass plate 3 in a conventional manner. In either event, in accordance with the present invention, member 9 is provided with an extension arm 8a having a knurled knob 8 at its outer end for manual operation in a well-known manner. Arm 8a passes beneath a pivoted lever 10 including a downwardly directed trailing portion 10a having an offset end positioned to extend below a second pivoted lever 12. Lever 12 in turn extends at right angles to lever 10 and includes a vertically offset end serving to contact and support a guide pin 11a projecting from the roof edge prism 7. By this arrangement it will be understood that movement of photosensitive member 9 from the position of Fig. 1 to the position shown in Fig. 5 serves to pivot member 10 in a vertically upward direction to in turn raise lever 12 and therewith elevate the roof-edge prism 7 from the position shown in Figs. 1 to 4 inclusive to the position shown in Figs. 5, 6, 7 and 8. Roof-edge prism 7 is mounted to rock about a fixed pivot pin 7a for this purpose.

The reflex mirror arrangement further includes a Newton viewer system comprising the viewer lens 4 and the spaced lens 13 (see Figs. 1, 3 and 4). Normally, determination of the picture section by the Newton viewer is prevented by reason of the positioning of roof edge prism 7 to overlie the ground glass plate 3. However, upon movement of the roof edge prism to the position of Fig. 6, the path of rays in the Newton viewer is freed so that the picture section may be determined.

In accordance with the present invention, it is proposed to make use of the Newton viewer system in combination with the photosensitive light measuring mechanism in such manner that observation through the viewer eye piece 4 also serves to read a scaler indication of the light intensity measured by the photosensitive member 9. For this purpose the support mounting for the photosensitive member 9 includes a laterally directed cam nose element 14 which is adapted to bear up against a pivoted mirror 15 upon movement of member 9 to its operative position, i. e., from that of Fig. 1 to that of Fig. 5. Normally mirror 15 is maintained in non-operative position against a stop peg 15a (see Fig. 1) by means of a biasing spring (not illustrated). As will be understood from an inspection of Fig. 5, movement of photosensitive member 9 to overlie the ground glass plate 3 causes mirror 15 to pivot into position between the viewer eye piece 4 and the roof-edge prism 7 at an angle of 45° to the optical axis of the Newton viewer.

Mirror 15 is formed to be partially transparent, and when positioned to intersect the path of rays in the Newton viewer system also serves to mirror a reflection from the exposure meter's scale and pointer mechanism through a glass plate 16 and lens 16a. The arrangement is such that viewer eye piece 4, mirror 15 and lens 16a forms an optical system having a focal point in the exposure time scale. It will thus be apparent that the reading of the exposure meter is transferred directly to the operator's eye without requiring the withdrawal of the eye from the viewer eye piece 4. It will further be understood that this eliminates the conventional practice of taking several sights through the viewer eye peice while intermittently comparing the visual picture with the reading on the exposure meter.

After the exposure time measuring has been completed, the photosensitive element 9 can be returned to its non-operative position by simply pulling back on the knurled knob 8. This action automatically returns the reflecting mirror 15 under the effect of its tension spring to its non-operative position against stop peg 15a. At the same time lever 10 is again permitted to return to its initial position (see Fig. 2) allowing the raised lever 12 to pivot downwardly together with the roof-edge prism under the action of a return spring (not illustrated). It will thus be appreciated that the mirror reflex system is once again set up for viewing the picture in order to permit sharp adjustment of the camera.

After the sharp adjustment of the camera is completed, the operator may then proceed to snap the picture by depressing the conventional shutter release mechanism. A feature of the present invention resides in the provision of interlocking control means disposed between the shutter release mechanism and the mirror reflex system for the purpose of simultaneously actuating such system to its non-operative position in which the light ray path in the Newton viewer and between the camera lens and shutter mechanism is unobstructed.

A preferred form of such interlocking control is shown in the accompanying drawings and includes a shutter release axle 26 adapted to be actuated by means of laterally projecting plate 25 operated from a push button 18 (see Figs. 2 and 6). An interlock between the shutter release and the reflex mirror system is provided by a pivoted lever 19 having opposed arms extending into the path of movement of the push button mechanism and the pivoted mirror reflex system control lever 21. The actuating push button 18 is mounted for vertical reciprocation by means of a rod 27 passing through an end opening in a cup-shaped member 24 carried at one end of the connecting plate 25. Member 24 includes a radially outwardly directed flange at its upper open end which cooperates with a bias spring 18a positioned between such flange and a stationary part of the camera body. The arrangement is such that under normal conditions cup member 24 and plate 25 are urged to the positions shown in Figs. 2 and 6 to withdraw plate 25 from a raised shoulder 26a on the shutter actuating axle 26. When so tensioned, the shutter mechanism is conditioned for a picture snapping operation.

Push button 18 is normally held in such extended position (as shown in Fig. 2) to project out of the recess provided by the cup-shaped member 24 under the effect of a compression spring 23 carried in the cup. Spring 23 is stronger than spring 18a so that initial depression of push button 18 serves to compress spring 18a and cause downward movement of cup member 24. Continued downward movement of member 24 causes the pivoted lever 19 to rotate in a clockwise direction to raise the one-armed lever 21 and therewith the roof-edge prism unit 7 vertically upwardly to free the ray path of the Newton viewer 4, 13. At the same time, upward movement of lever 21 causes pivoting of reflex mirror 2 about its pivot axle 2a (see Fig.4) by means of a link 22 connected between the mirror and the free end of lever 21, to free the ray path between lens 1 and the shutter mechanism. The downward movement is arrested by a detent 20 which may comprise a spring urged cup or rod member of a common construction at the point where prism 7 and mirror 2 are in their non-operative positions, i. e., the ray paths are free and unobstructed. Continued downward depression of push button 18 causes the previously untensioned spring 23 to compress and thereafter to positively move drum member 24 and lever 25 downwardly until lever 25 abuts the raised shoulder 26a on the shutter operating axle 26, and thereafter to depress the axle and release the shutter. It will be appreciated that this sequence of operation thus permits the operator to view the scene which is to be pictured through the Newton viewer system while he is in the act of operating the shutter release mechanism. One of the advantages of the present arrangement is that the movement of the reflex mirror to its non-operative position and the subsequent release of the shutter mechanism are distinct and isolated operations through the provision of the detent means 20 which serves as a pressure point physically indicating to the operator that the reflex mirror is in its non-operative position.

After the shutter release is tripped, push button 18 may be allowed to return to its original position readied for a subsequent picture snapping operation by the automatic return of springs 18a and 23 to their untensioned condition. Simultaneously with the return of push button 18 to its initial position, the roof-edge prism 7 also returns to its operative position under the effect of a return spring (not illustrated), the reflex mirror 2 being returned to the position illustrated in Fig. 3 by the return of lever 21 to its initial position.

A further advantage of the present arrangement will be readily understood from an inspection of Fig. 5 of the drawings which discloses that the shutter release operation may take place in an identical manner to that described above with the element 9 positioned to overlie the ground glass plate 3. It will be readily understood by those skilled in the art that this unique provision is of substantial utility when the picture must of necessity be taken under conditions in which the illumination present is unstable, as for example, by firelight or candlelight. In such case, the instant arrangement permits the operator to obtain an instantaneous indication of the most suitable illumination superimposed over and synchronized with the view found to be most suitable optically.

As many apparently widely different embodiments of this invention may be made without departing from the spirit and scope hereof, it is to be understood that the above invention is not limited, except as defined in the appended claims.

What is claimed is:

1. A mirror reflex camera having a reflex mirror system including a pivoted roof-edge prism and a pivoted mirror element positioned on opposite sides of a ground glass plate, said mirror element including means positioning it in the ray path between the camera lens and the shutter mechanism, and said roof-edge prism including means normally positioning it in alignment with said mirror and said ground glass plate, a photosensitive element in said camera including means mounting said element for movement into the path of light rays between said mirror element and said roof-edge prism in the region of said ground glass plate whereby said photosensitive element may intercept the rays reflected from said mirror element to evaluate the exposure light, said photosensitive element further including means cooperating with said roof-edge prism upon movement of said photosenstive element to said light ray intersecting position to move said roof-edge prism from its operative to a nonoperative position out of alignment with said mirror element and said ground glass plate, a viewer system in said camera including an eye piece viewing lens normally in alignment with said roof-edge prism when said prism is in its operative position, exposure indicating mechanism connected with said photosensitive element and adapted to indicate the exposure light intensity, and a partially reflecting element connected to said photosensitive element for operation by said element upon movement of said element to said ray path intersecting position to project the reading of said exposure indicating mechanism upon the eye piece viewing lens.

2. A mirror reflex camera as set forth in claim 1 including means connected with said pivoted mirror element and adapted to independently move said mirror element from its normal operative position intersecting the ray path between said lens and shutter mechanism to a non-operative position unobstructing said ray path.

3. A mirror reflex camera as set forth in claim 1 including a shutter release means, and control mechanism connected between said shutter release means and said reflex mirror element for moving said mirror element to a non-operative position unobstructing the ray path between said lens and said shutter mechanism.

4. A mirror reflex camera as set forth in claim 1 in which said reflex system includes means supporting said roof-edge prism and said reflex mirror element for selective and independent movement between operative and non-operative positions.

5. A mirror reflex camera as set forth in claim 4 including a shutter release means and control linkage connected between said shutter release control means and said reflex system for simultaneously moving said roof-edge prism and said reflex mirror element to non-operative positions.

6. A mirror reflex camera as set forth in claim 1 in which said roof-edge prism and said pivoted reflex mirror element are mounted for independent actuation, and including a shutter release mechanism comprising control linkage connected with said roof-edge prism and said reflex mirror element for actuating the same to non-operative positions, said control linkage including means for moving the components of said reflex system to their non-operative positions prior to release of the shutter mechanism.

7. A mirror reflex camera as set forth in claim 6 in which said shutter release control mechanism includes a manually operable release member that moves in the same direction to effect at first said movement of components and then said shutter release, and means for increasing the resistance to such movement of said release member between these two steps.

8. A mirror reflex camera as set forth in claim 1 including linkage means connecting said roof-edge prism and said mirror reflex element for simultaneous actuation to non-operative positions, said linkage means including a lost motion connection permitting movement of said roof-edge prism to its non-operative position independently of actuation of said reflex mirror element.

References Cited in the file of this patent

FOREIGN PATENTS

| | | |
|---|---|---|
| 760,954 | France | Dec. 27, 1933 |
| 232,142 | Switzerland | Aug. 1, 1944 |